(12) United States Patent
Takizawa et al.

(10) Patent No.: US 9,099,143 B2
(45) Date of Patent: Aug. 4, 2015

(54) METHOD FOR PRODUCING MAGNETIC RECORDING MEDIUM

(75) Inventors: Kazutaka Takizawa, Fuchu (JP); Kaori Kimura, Yokohama (JP); Takeshi Iwasaki, Inagi (JP); Akihiko Takeo, Kunitachi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 284 days.

(21) Appl. No.: 13/541,359

(22) Filed: Jul. 3, 2012

(65) Prior Publication Data
US 2013/0065083 A1 Mar. 14, 2013

(30) Foreign Application Priority Data
Sep. 9, 2011 (JP) ............................... 2011-197480

(51) Int. Cl.
*B44C 1/22* (2006.01)
*G11B 5/855* (2006.01)
*G11B 5/31* (2006.01)

(52) U.S. Cl.
CPC .............. *G11B 5/855* (2013.01); *G11B 5/3163* (2013.01)

(58) Field of Classification Search
CPC ............................... G11B 5/855; G11B 5/3163
USPC ........... 216/22, 41, 83; 29/603.18; 438/3, 745
See application file for complete search history.

(56) References Cited

U.S. PATENT DOCUMENTS 5,174,816 A * 12/1992 Aoyama et al. ............ 106/217.6
6,582,279 B1 * 6/2003 Fox et al. ........................ 451/37
2004/0165428 A1 * 8/2004 Odagawa et al. ............ 365/171
2009/0166323 A1 * 7/2009 Shirotori et al. ................ 216/22
2009/0308837 A1 * 12/2009 Albrecht et al. ................ 216/22
2010/0028373 A1 * 2/2010 Fujioka et al. ............. 424/185.1
2012/0028373 A1 * 2/2012 Belen et al. ........................ 438/3
2012/0206834 A1 * 8/2012 Ueda et al. ...................... 360/86

FOREIGN PATENT DOCUMENTS

| JP | 2000-298822 | 10/2000 |
|---|---|---|
| JP | 2002-279616 | 9/2002 |
| JP | 2005-029779 | 2/2005 |
| JP | 2008-243264 | 10/2008 |
| JP | 2009-129492 | 6/2009 |
| JP | 2009-301655 | 12/2009 |
| JP | 2010-033635 | 2/2010 |
| JP | 2010-140569 | 6/2010 |
| JP | 2010-146668 | 7/2010 |
| JP | 2011-076676 | 4/2011 |
| JP | 2011-090724 | * 5/2011 |
| WO | 2008/126315 | 10/2008 |

OTHER PUBLICATIONS

Japanese Office Action dated Mar. 26, 2013, filed in Japanese counterpart Application No. 2011-197480, 4 pages. (including translation).

Japanese Office Action dated Nov. 20, 2012, filed in Japanese counterpart Application No. 2011-197480; 5 pages (including translation).

* cited by examiner

*Primary Examiner* — Binh X Tran

(74) *Attorney, Agent, or Firm* — Patterson & Sheridan, LLP

(57) ABSTRACT

According to at least one embodiment, a metal peelable layer and a mask layer are formed on a magnetic recording layer, then, a projections pattern is formed on the mask layer, the projections pattern is transferred to the metal peelable layer and the magnetic recording layer in this order, and then the metal peelable layer is dissolved and removed by a solvent. The metal peelable layer is constituted of any of aluminum and an aluminum compound. An alkali solution is used as the solvent.

6 Claims, 10 Drawing Sheets

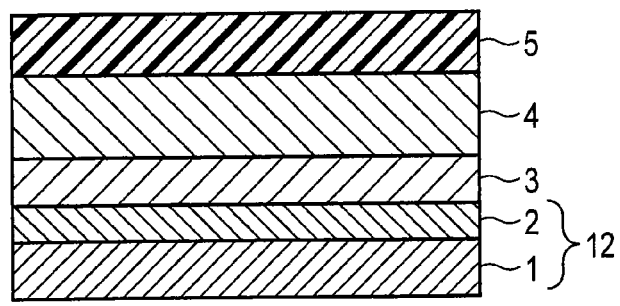
F I G. 1A
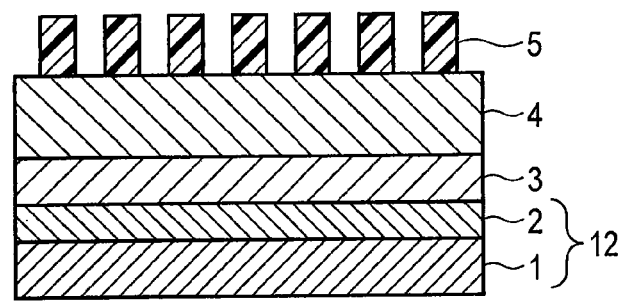
F I G. 1B
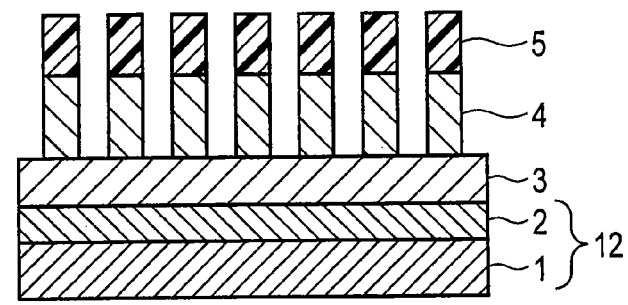
F I G. 1C

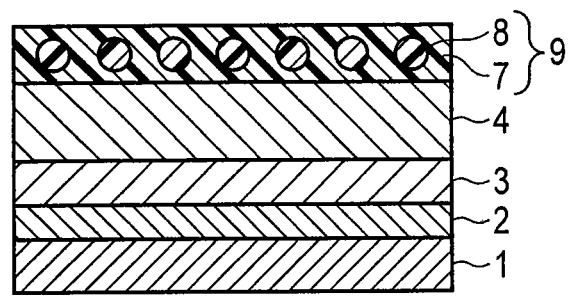
F I G. 2A
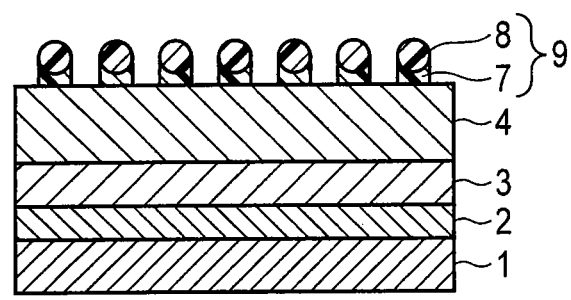
F I G. 2B
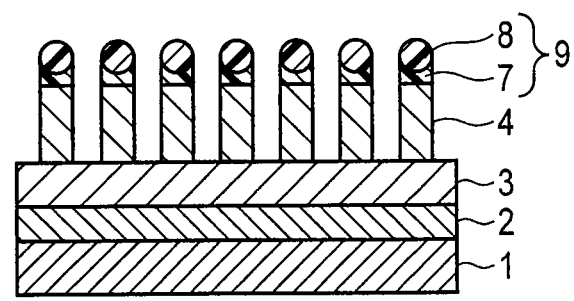
F I G. 2C

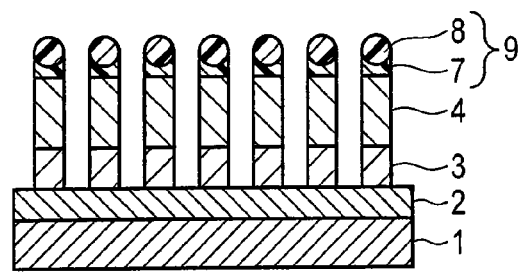
F I G. 2D
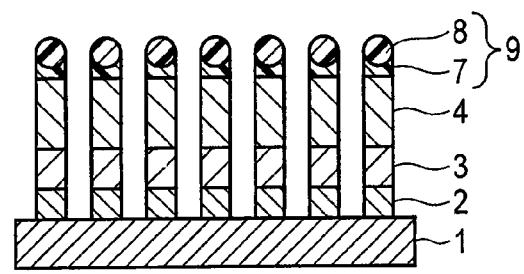
F I G. 2E
F I G. 2F
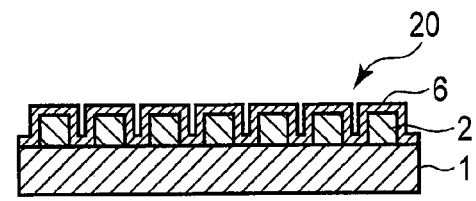
F I G. 2G

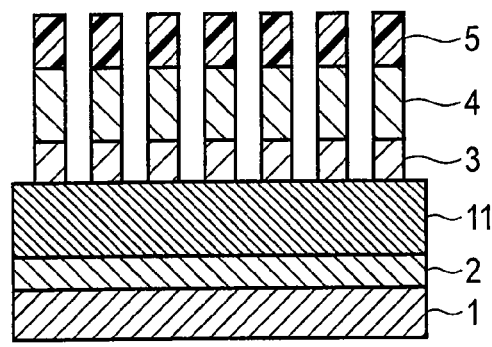
F I G. 3D
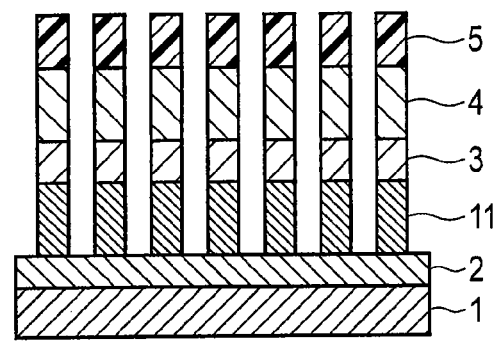
F I G. 3E
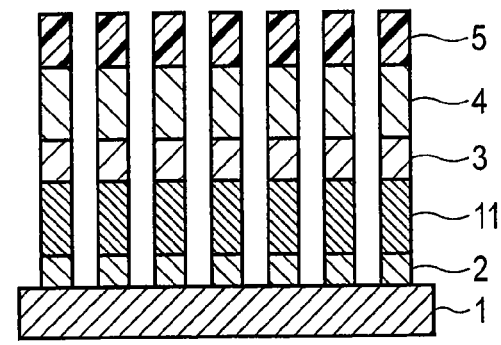
F I G. 3F

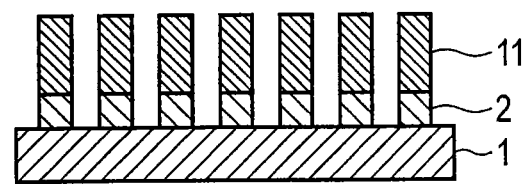
F I G. 3G
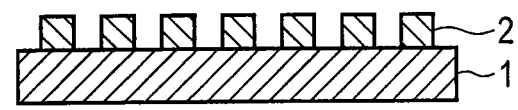
F I G. 3H
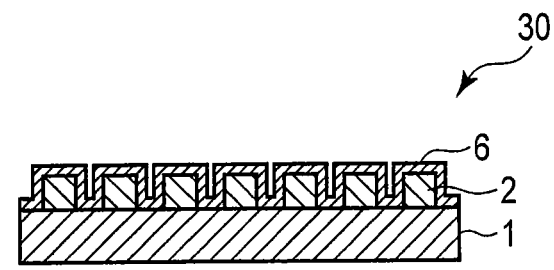
F I G. 3I

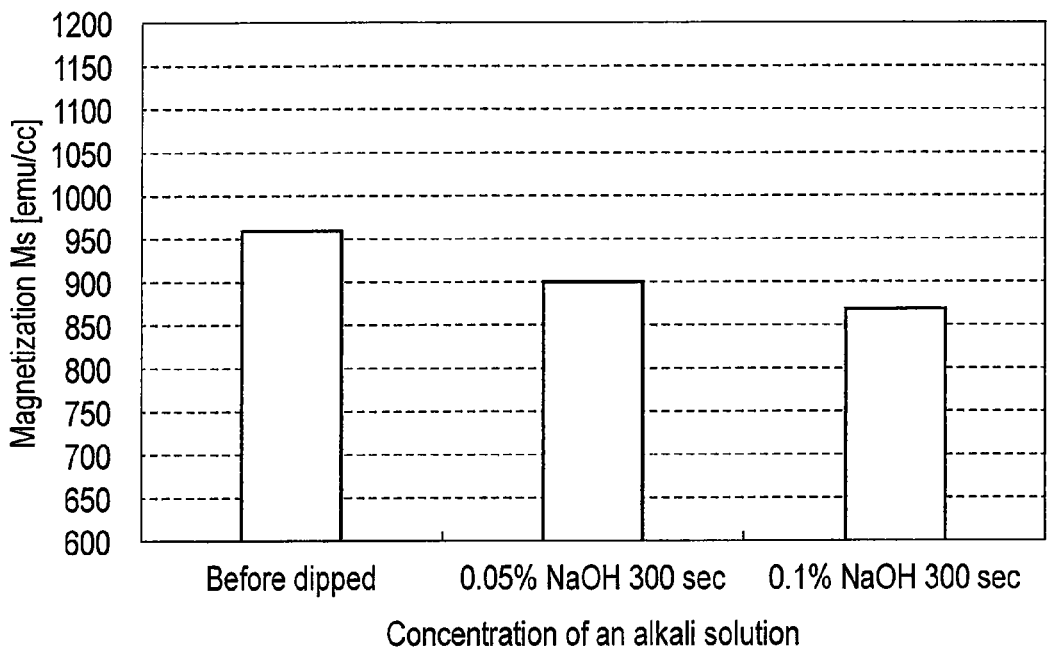
F I G. 4
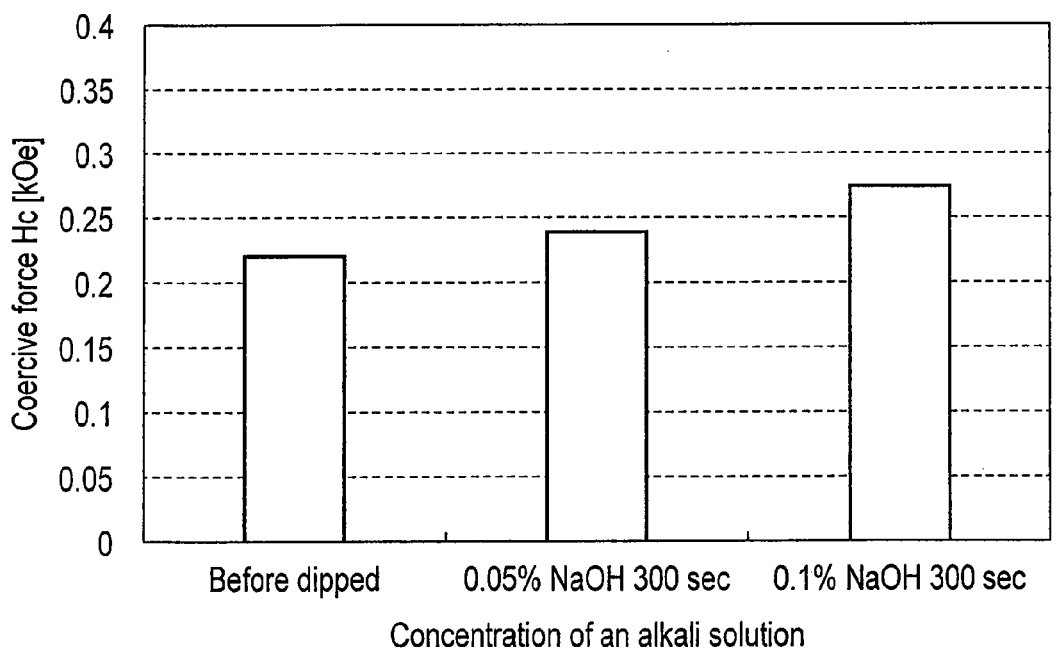
F I G. 5

METHOD FOR PRODUCING MAGNETIC RECORDING MEDIUM

CROSS-REFERENCE TO RELATED APPLICATIONS

This application is based upon and claims the benefit of priority from prior Japanese Patent Application No. 2011-197480, filed Sep. 9, 2011, the entire contents of which are incorporated herein by reference.

FIELD

Embodiments described herein relate generally to a method for producing a magnetic recording medium.

BACKGROUND

The amount of information handled in information communication devices is steadily increasing and there is therefore a strong desire for a realization of a mass-storage system. In a HDD (hard disk drive) field, developments of various technologies including a perpendicular magnetic recording system are being made to realize high recoding density. Moreover, a discrete track medium and a bit-patterned medium are proposed in which a recording pattern is longitudinally isolated as a medium which can improve recording density and is also resistant to thermal decay at the same time, and it is essential to develop technologies for the production of these mediums.

It is only necessary that cells for magnetic recording be magnetically separated from each other to record one bit information by one cell as in the bit-patterned medium. In many mediums, a magnetic dot portion and a nonmagnetic dot portion are formed in the plane based on fine processing technologies.

Specifically, the magnetic recording layer on the substrate is isolated by applying semiconductor production technologies. After a patterning mask is formed on the upper part of the magnetic recording layer and a projections pattern is formed on the patterning mask, the formed pattern is transferred to the magnetic recording layer to obtain a magnetic recording medium having a recording pattern isolated by projections.

In the formation of projections on the mask pattern, a resist material generally used in the production of semiconductors is used to carry out any of the methods including a method in which a projections portion is selectively reformed by applying energy rays to obtain a pattern, a method in which a self-organizing film of an array of patterns differing in chemical nature is formed in the resist film by patterning, and a method in which a projections pattern is physically imprinted on the, resist film to carry out patterning.

There is, besides the above method, a method in which after projections is formed on a mask pattern, ions emitted with high energy are injected into the magnetic recording layer to selectively deactivate the magnetism of the pattern, thereby obtaining a medium with a recording pattern magnetically isolated via a non-recording region.

Here, in the case of scanning a medium with a magnetic head configured to perform reading/writing of a magnetic recording medium, difference in height between protrusion and recess parts is increased, giving rise to head crash if the mask pattern on the magnetic recording layer remains. Further, if the distance between the magnetic recording layer and the magnetic head is large, the signal S/N detectable by the magnetic head is small. This is why it is necessary to eliminate the mask pattern on the magnetic recording layer to decrease the difference in height between protrusion and recess parts after the patterning of magnetic recording layer and therefore a peelable layer is generally formed between the magnetic recording layer and the mask layer in an actual process.

As an example of a peeling process in a bit-patterned medium, a method is given in which a carbon peeling layer is removed by dry etching. In this case, however, this poses the problem that the magnetic recording layer is oxidized by oxygen which is etching gas, resulting in deterioration in the magnetic characteristics of the recording layer. Further, in the case where a huge residue having a size equal to or above the width of the projections pattern of the mask layer, the residue can be scarcely removed in the case of carrying out dry etching and tends to become a peeling defective position, giving rise to the problem that the position is left as a projection pattern on the medium. It is therefore difficult to obtain a medium ensuring longitudinal uniformity.

In the case of wet peeling on the contrary to the dry peeling, peeling progresses isotropically when a peeling solution is brought into contact with the peelable layer and therefore, a huge residue which is left in dry peeling can be peeled. Accordingly, an example is given in which a silicon-containing polymer is used as the peelable layer and this layer is wet-peeled by an organic solvent.

However, when the silicon-containing polymer is used for the peelable layer, heat energy is applied to the peelable layer by the formation of a mask layer or by etching to thereby promote a crosslinking reaction, resulting in significant hardening of the peelable layer. For this, the peelable layer is deteriorated in solubility in a solution, so that peeling defective parts are increased and also, long peeling time is required, leading to increase in process cost.

BRIEF DESCRIPTION OF THE DRAWINGS

FIG. 1A is a view showing an example of a method for producing a magnetic recording medium according to a first embodiment;

FIG. 1B is a view showing an example of a method for producing a magnetic recording medium according to a first embodiment;

FIG. 1C is a view showing an example of a method for producing a magnetic recording medium according to a first embodiment;

FIG. 2A is a view showing other example of a method for producing a magnetic recording medium according to a first embodiment;

FIG. 2B is a view showing other example of a method for producing a magnetic recording medium according to a first embodiment;

FIG. 2C is a view showing other example of a method for producing a magnetic recording medium according to a first embodiment;

FIG. 2D is a view showing other example of a method for producing a magnetic recording medium according to a first embodiment;

FIG. 2E is a view showing other example of a method for producing a magnetic recording medium according to a first embodiment;

FIG. 2F is a view showing other example of a method for producing a magnetic recording medium according to a first embodiment;

FIG. 2G is a view showing other example of a method for producing a magnetic recording medium according to a first embodiment;

FIG. 3D is a view showing an example of a method for producing a magnetic recording medium according to a second embodiment;

FIG. 3E is a view showing an example of a method for producing a magnetic recording medium according to a second embodiment;

FIG. 3F is a view showing an example of a method for producing a magnetic recording medium according to a second embodiment;

FIG. 3G is a view showing an example of a method for producing a magnetic recording medium according to a second embodiment;

FIG. 3H is a view showing an example of a method for producing a magnetic recording medium according to a second embodiment;

FIG. 3I is a view showing an example of a method for producing a magnetic recording medium according to a second embodiment;

FIG. 4 is a graph showing the relation between the density of an alkali solution and magnetization;

FIG. 5 is a graph showing the relation between the concentration of an alkali solution and coercive force;

DETAILED DESCRIPTION

Figure 1D:
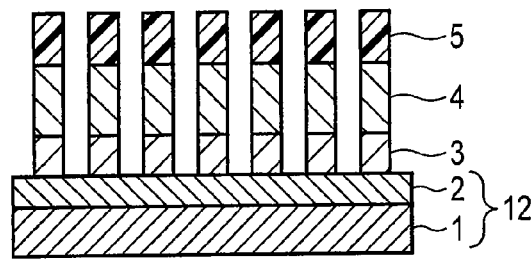
FIG. 1D is a view showing an example of a method for producing a magnetic recording medium according to a first embodiment.

In general, according to one embodiment, a method for producing a magnetic recording medium comprises: forming a magnetic recording layer on a substrate; forming a metal peelable layer on the magnetic recording layer; forming a mask layer on the metal peelable layer; forming a projections pattern on the mask layer; transferring the projections pattern to the metal peelable layer by etching; transferring the projections pattern to the magnetic recording layer by etching; and dissolving and removing the metal peelable layer by using a solvent.

The metal peelable layer is made of either aluminum or an aluminum compound.

As the solvent, an alkali solution is used.

A protective layer may be further formed on the magnetic recording layer on which the projections pattern is formed.

Further, a method for producing a magnetic recording medium according to a second embodiment comprises: forming a magnetic recording layer on a substrate; forming an intermediate mask layer on the magnetic recording layer; forming a metal peelable layer on the intermediate mask layer; forming a mask layer on the metal peelable layer; forming a projections pattern on the mask layer; transferring the projections pattern to the metal peelable layer by etching; transferring the projections pattern to the intermediate mask layer by etching; transferring the projections pattern to the magnetic recording layer by etching; removing the metal peelable layer by using an alkali solution; and removing the first mask layer by etching.

Like the first embodiment, the metal peelable layer is made of either aluminum or an aluminum compound.

The metal peelable layer is removed by an alkali solution in the same manner as in the first embodiment.

A protective layer may be further formed on the magnetic recording layer on which the projections pattern is formed in the same manner as in the first embodiment.

According to this embodiment, aluminum is used which is limited in damages to the magnetic recording layer and is peelable by an alkali solution and therefore, a magnetic recording medium is obtained which is reduced in peeling residue and improved in the characteristics of HDI (head disk interface).

The aluminum compound may contain at least one component selected from the group consisting of nitrogen, boron, silicon and carbon.

According to the embodiment, the addition of the above component to aluminum to be used as the peelable layer improves the surface flatness, so that macro-projections of the self-organizing film become small and therefore, the longitudinal unevenness of the surface of the medium is reduced.

Further, the side surface of the aluminum peelable layer to be exposed to the air after being processed is naturally oxidized. However, the influence of oxidation is reduced by the addition of the above component, and therefore, etching rate is not dropped, making possible to improve peelability.

Because the density of the aluminum peelable layer is dropped by addition of the above component, alkali etching rate is increased. Therefore, the time required for producing a medium is reduced.

This embodiment will be explained with reference to the drawings.

(First Embodiment)

In the method for producing a magnetic recording medium according to a first embodiment, a mask pattern and a peelable layer are formed on the magnetic recording medium, a projections pattern is formed on the magnetic recording layer, and then, the peelable layer is removed to thereby obtain a magnetic recording medium with a projections pattern.

FIGS. 1A to 1G are views showing an example of the method for producing a magnetic recording medium according to the first embodiment.

FIGS. 2A to 2G are views showing other example of the method for producing a magnetic recording medium according to the first embodiment.

The method shown in FIGS. 2A to 2G is the same as that shown in FIGS. 1A to 1G except that a self-organizing layer 9 is formed instead of a resist layer 5 and a projections pattern is formed on the self-organizing layer 9.

First, as shown in FIG. 1A, a magnetic recording medium 12 is prepared, and a peelable layer 3, a mask layer 4, and the resist layer 5 are formed in this order on the magnetic recording medium 12.

Magnetic recording layer formation step

A magnetic recording layer 2 is formed on a substrate 1 to obtain the magnetic recording medium 12. As the substrate, a glass substrate, a metal-containing substrate, a ceramics substrate, or the like may be used. A glass substrate having good flatness is preferably used. The magnetic recording layer 2 is constituted of a nonmagnetic underlayer made of a metal and a perpendicular magnetic recording layer containing Co as its major component and may also contain Pt and a metal oxide. The nonmagnetic underlayer serves to improve the crystal orientation of the perpendicular magnetic recording layer. For example, a Ru type metal, or Pd type metal, Pt type metal or its alloy may be used as the nonmagnetic underlayer. Further, an alloy such as CoPt, CoCr, CoCrPt, CoCrSi, or $CoCrSiO_2$ may be used. An adhesive layer and a soft magnetic underlayer may be formed between the substrate 1 and the magnetic recording layer 2. The adhesive layer serves to improve adhesion to the substrate, and for example, Cr, Ta, Ti, NiTa or the like may be used for the adhesive layer. Further, the soft magnetic underlayer serves to feed back the recording magnetic field from the magnetic recording head to the perpendicular magnetic recording layer to thereby improve recording/regeneration efficiency, and an alloy containing Co as its major component may be used as the soft magnetic underlayer. Specific examples of these alloys include CoZr, CoZrNb, and CoZrTa.

These layers may be formed plurally.

The thickness of the perpendicular magnetic recording layer may be designed to be 5 nm or more to measure regenerated output signals with high accuracy and 40 nm or less to restrain the distortion of signal strength.

A diamond-like carbon film which is to be a protective film may be formed on the upper part of the Co-type perpendicular recording layer. A magnetic recording layer can be thereby obtained.

Peelable Layer Formation Step

In succession, a peelable layer 3 is formed on the magnetic recording layer 2. In a wet process using a peeling solution, it is essential to restrain the deterioration of the magnetic characteristics of the magnetic recording layer when the magnetic recording layer is exposed to a solution and, at the same time, to secure practical peeling speed in the peeling layer. Specifically, it is required to select a peeling solution and peelable layer material such that a Co type metal used for the magnetic recording layer is sparingly soluble and the peeling layer is easily soluble, and the above items can be satisfied in an alkaline range at a pH of 7 or more.

Although, on the other hand, examples of peeling material soluble in an alkali among various peelable materials include Al, Zn, and Sn, Al or its compound is used as the material having a relatively higher peeling speed.

When an aluminum film is used, the peeling speed in an alkali solution tends to be reduced by a natural oxide film formed on the surface, and therefore, the peelable layer is made of a semimetal or nonmetal or an aluminum compound obtained by adding these semimetals or nonmetals to Al, whereby the above problem can be solved. Specific examples of the component to be added to aluminum include carbon, nitrogen, boron, silicon, and compounds of these metals. The addition component is bound with an Al atom or penetrates into Al lattices to thereby produce the effect of inhibiting the bonding with oxygen. Further, the net Al density is dropped, resulting in the formation of a non-dense film. Therefore, the peeling speed is eventually increased by the limitation to the natural oxidation of the surface of Al and drop in the density of Al, thereby achieving reduction in the time required for production process.

On the other hand, the addition of elements to Al has the effect of improving the flatness of a thin film. Al increases the surface roughness of the peelable layer because it easily constitutes crystal grains in the stage of film formation. However, since crystallization is hindered by addition of elements, the surface roughness can be reduced. Although, for example, 10 at. % BN, 10 at. % C, 10 at. % Si, 10 at. % $B_4C$, and the like may be added to Al, the amount to be added may be changed to the extent that peeling speed can be maintained. In one example, the average roughness of an aluminum film is 0.64 nm whereas it can be reduced to 0.38 nm by addition of 10 at. % BN and to about 0.3 nm by addition of 10 at. % $B_4C$.

The etching rates of Al and other various compounds in the case of using an aqueous 0.1% sodium hydroxide solution or an aqueous 0.05% sodium hydroxide solution (concentration: % by weight) as the peeling solution are shown in the following Table 1.

TABLE 1

|  | Al | Al-5 at. % BN | Al-10 at. % BN | Al-5 at. % C | Al-10 at. % C | Al-10 at. % $B_4C$ |
|---|---|---|---|---|---|---|
| Aqueous 0.1% NaOH solution | 0.254 | 1.2 | 3.75 | 1.5 | 0.67 | 5.56 |
| Aqueous 0.05% NaOH solution | 0.1016 | 0.348 | 0.983 | 0.77 | 0.268 | 2.17 |

The value in the table shows the rate of reduction in film thickness per unit time when using Al peeling materials, and when this value is large, this means that the peeling speed is high. As compared with the value of Al, an Al compound to which various elements are each added are improved in etching rate and can be dissolved in a low-concentration alkali solution. The etching rates of Al compounds to which 10 at. % BN and 10 at. % $B_4C$ are respectively added are larger by several times that of an Al single material and the peelable layer can be peeled in a short time, which allows the Al compound to contain nitrogen and boron, or nitrogen and carbon.

The peelable layer may be formed on the magnetic recording layer by various methods including physical/mechanical vapor deposition methods. In this case, the magnetic characteristics in the magnetic recording layer are not desirably deteriorated by heat history and the like. Further, when the elements less diffuse into the lower magnetic recording layer and upper mask layer, this is better.

No particular limitation is imposed on the ratio of the elements to be added to the Al film and the ratio may be regulated taking peeling speed and surface characteristics into account.

Mask Layer Formation Step

A mask layer 4 configured to transfer a projections pattern is formed on the upper part of the peelable layer 3. As the mask layer 4, a material which can transfer the upper projections pattern physically or chemically may be selected. The mask layer may be constituted of a multilayer body containing a first layer and a second layer made of a material different from that of the first layer.

The mask layer can be formed by physical vapor deposition methods typified by deposition, sputtering and ion plating or chemical vapor deposition methods using heat or plasma. The thickness of the mask layer may be regulated in consideration of the pitch and height of the projections pattern.

Further, because the uniformity of the upper layer projections pattern largely depends on the surface roughness of the mask layer, the surface roughness may be reduced.

Resist Layer Formation Step

In succession, as shown in FIG. 1A, a resist layer 5 for forming a projections pattern on the upper part of the mask layer 4 is formed. No particular limitation is imposed on the type, and positive type/negative type of the resist layer 5, and a backbone chain truncated type, chemical amplification type, or crosslinking type resist may be used as a material forming a latent image by irradiation with energy rays. Examples of the resist material include polymer materials such as a novolac type resin, polystyrene, polymethylmethacrylate, polyethylene terephthalate, poly-α-methylstyrene, polyhydroxystyrene, and hydrogen silsesquioxane.

Further, in other example of the method for producing a magnetic recording medium according to the first embodiment, a self-organizing layer 9 is, as shown in FIG. 2A, formed instead of the resist layer 5 to form a projections pattern by the self-organizing phenomenon that a fine regular pattern can be formed inside of the thin film. In this case, as the material of the self-organizing film, those constituted of a block copolymer or random copolymer having at least two polymer chains can be selected. Each fundamental structure of these materials is one in which polymers differing in chemical characteristics are covalent-bonded with each other like (block-A)-(block B). Specifically, a polyethylene, polystyrene, polyisoprene, polyvinylpyridine, polymethylmethacrylate, polydimethylpolysiloxane, polylactic acid, and the like may be combined upon use, though examples of the self-organizing material are not limited to these compounds.

When the self-organizing material is used as the resist film, various parameters such as the molecular weight of the polymer material are adequately set to obtain desired pattern dimensions.

Other than the above, a nano-imprint method may be applied in which a projection die, that is, a stamper is physically imprinted to form a pattern and a resist material to be used in this method may be properly selected. Specifically, organic coating glass (spin on glass), a heatcurable resist material, or ultraviolet-curable resist material may be used. In this case, the stamper is pressed down against and held on the resist layer and then, released from the resist layer. Because the collapse of the resist layer is reduced if the stamper is well released, it is desirable to process the projections pattern by releasing treatment using a silane coupling agent in advance.

These resist layers may be formed by applying a solution prepared by dissolving a resist material in a solvent by a spin coating or spray coating method. At this time, an adhesive layer may be formed under the resist layer to improve adhesion to the underlayer. Or, the adhesion of the resist layer may be improved by hydrophobicizing the resist underlayer without any problem.

Further, the resist film may not be a monolayer and may be a multilayer structure by combining materials differing in energy sensitivity and fluidity.

Resist Layer Patterning Step

Next, a projections pattern is formed on the resist layer 5 as shown in FIG. 1B.

The resist layer is selectively changed in its chemical nature by irradiation with energy rays. As specific energy rays, ultraviolet rays such as KrF and ArF, electron beams, charged particle beams, extreme ultraviolet rays, and X rays may be used. Further, methods such as interference exposure and step-and-repeat projection alignment may be adopted.

The step of forming a projections pattern on the resist layer 5 will be explained according to an example of patterning of a positive type resist. First, energy rays are applied to a place where a recessed portion is formed on the resist layer 5, that is, the portion is exposed to light. At this time, the amount of energy enough to develop the resist layer 5 is required and therefore, the exposure dose is controlled corresponding to various types of resist materials.

In succession, the resist layer corresponding to the exposed place is chemically removed by developing. An alkali developing solution, for example, tetramethylammonium hydroxide may be used as the developing solution for the resist film. As the organic developing solution, ester type solvents such as methyl acetate, ethyl acetate, butyl acetate, amyl acetate, hexyl acetate and octyl acetate, ketone type solvents such as methyl ethyl ketone, methyl isobutyl ketone, and propylene glycol monoethyl acetate, aromatic solvents such as anisole, xylene, toluene, and tetralin, and alcohol type solvents such as ethanol, methanol, and isopropyl alcohols may be used.

Though examples of the parameters relating to developing include time, liquid temperature, and viscosity, these parameters may be properly regulated to form a desired pattern. Although examples of the developing method include a dipping method in which a sample is dipped in a developing solution, a paddle method or spin method in which a developing solution is added dropwise on the upper part of the sample, a developing method may be properly selected corresponding to a desired pattern.

The pattern after being developed is rinsed to remove the developing solution from the surface of the pattern. If the rinsing solution is compatible with the developing solution, the developing solution can be dissolved and removed. Though typical examples of the rinsing solution include alcohol type solvents such as isopropyl alcohol and ethanol, the ring solution is not limited to these types and may be selected based on a combination with the resist film.

Finally, the rinsing solution on the resist film is dried to obtain a projections pattern of the resist layer 5 as shown in FIG. 2B. As the drying method, a method in which inert gas such as $N_2$ is sprayed directly on a sample, heating drying method in which the substrate is heated at a temperature higher than the boiling point of the rinsing solution to vaporize the rinsing solution, and spin drying, supercritical drying and the like may be applied. A projections pattern of the resist film is obtained in the above manner.

When the self-organizing layer 9 of a polymer is used, annealing is carried out after a polymer solution is applied to thereby form a micro-phase separation pattern in the film, thereby enabling the formation of a projections pattern by using the micro-phase separation as a mask pattern. When energy is, like annealing, applied to, for example, a diblock copolymer film containing two kinds of polymer chains, each polymer phase is phase-separated to form a pattern including a sea-like polymer phase 7 and an island-like polymer phase 8. At this time, a projections pattern of the self-organizing layer 9 can be produced by selectively removing one of these polymer phases, that is, the polymer phase 7 by etching as shown in FIG. 2B.

In the annealing, heat annealing in which a sample is exposed and held in a high-temperature atmosphere or solvent annealing in which a sample is exposed and held in a solvent atmosphere can be applied.

Other examples of the method used to physically form a projections pattern include a nano-imprinting method. In this case, a stamper having a desired projections pattern is used to press the pattern directly against the resist layer and then, the stamper is released. Although, at this time, a method in which the stamper is pressed down under high pressure and a method in which the resist layer is irradiated with energy rays such as ultraviolet rays during pressing the stamper to cure the resist, which is then released may be adopted, various methods may be applied taking pattern dimension and production process into consideration. A projections pattern is thus formed on the mask layer 4.

Mask Layer Patterning Step

Next, as shown in FIGS. 1C and 2C, the projections pattern of the resist layer 5 or self-organizing layer 9 is transferred to the mask layer 4.

Because the mask layer 4 becomes a processing pattern of the magnetic recording layer, it preferably has the processing resistance of the magnetic recording layer. Specifically, a mask layer having a lower etching rate than the magnetic recording layer is selected. Though wet etching or dry etching may be applied in the processing of the mask layer 4, dry etching which can retain the rectangularity of a pattern relatively satisfactorily may be applied because pattern dimension is largely changed by the influence of the side etching extended in a lateral direction with respect to patterned projections.

The mask layer 4 has a variety of structures by combinations of different materials and etching gases. For example, there is a method using a multilayer mask of Si and C as a mask material. Si has high etching resistance to $O_2$ plasma and low resistance to $F_2$ plasma on the contrary. On the contrary, C has high etching resistance to $F_2$ and low resistance to $O_2$ plasma. Therefore, the mask layer can be processed, at a high aspect ratio by combining hard masks of the both with etching gases.

However, the etching of the mask layer 4 is not limited to the above materials and methods, and the problem concerning etching selective ratio can be solved by selecting an optimum mask material from the structures of etching gas and a sample. Other examples of the material of the hard mask include Al, Ti, Cr, Ni, Cu, Ge, Mo, Cr, Ta, W, or compounds or oxides of these metals.

When the mask layer is a multilayer, examples of the multilayer include layer structures of C/Si, Si/C/Si, Si/Cu, Si/Ni, Si/Cr, Ta/Cu, Ta/Ni, Ta/Cr from the substrate side. In this case, the order of the upper layer and the lower layer may be reversed depending on the combination with etching gas.

Further, because, generally, materials containing many C and H atoms such as a benzene ring have high etching resistance, various high-molecular materials according to these materials having many C and H atoms may be applied to the mask material.

Examples of the etching gas include fluorine-based gases such as $CF_4$, $C_2F_6$, $C_3F_8$, $C_4F_8$, $ClF_3$, $CCl_3F_5$, $C_2ClF_5$, $CHF_3$, and $NF_3$, and chlorine-based gases such as $Cl_2$, $BCl_3$, $CCl_4$, and $SiCl_4$. Other than the above, $H_2$, $N_2$, HBr, $NH_3$, CO, He, Ne, Ar, Kr, and Xe may be applied. A mixture gas obtained by blending two or more of these gases may be used to regulate etching speed and etching selective ratio. Further, as methods for generating plasma, various methods such as capacitive coupling, inductive coupling, electron cyclotron resonance, and multi-frequency superimposed coupling may be applied. With regard to the regulation of pattern dimension, parameters such as process gas pressure, gas flow rate, plasma input power, substrate temperature, chamber atmosphere and ultimate vacuum may be properly designed.

When the etching resistance of the mask layer is sufficiently secured, physical etching such as ion milling may be carried out without any problem.

Peelable Layer Patterning Step

As shown in FIGS. 1D and 2D, the protruding and recessed pattern is transferred to the peelable layer 3 under the mask layer 4. An Al compound which is to be the peelable layer 3 can be designed to have lower physical etching resistance than the upper mask layer 4. In this case, the pattern can be easily transferred by a method such as ion milling.

When chemically active gas is used to carry out dry etching, the reformation of the surface of the Al peelable layer 3 can be decreased. If the surface is reformed, the reaction on an etching solution is hindered and therefore, etching rate is dropped, bringing about deteriorated peelability. In this case, it is desirable to remove the reformed part in advance by etching.

Magnetic Recording Layer Patterning Step

Figure 1E:
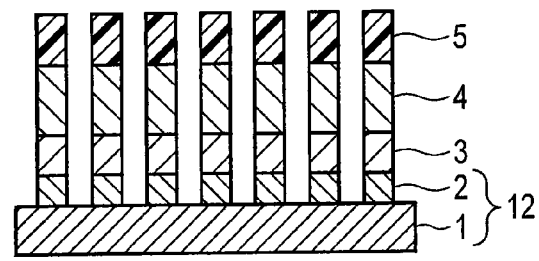
FIG. 1E is a view showing an example of a method for producing a magnetic recording medium according to a first embodiment.

As shown in FIGS. 1E and 2E, the projections pattern is transferred to the magnetic recording layer 2 under the peelable layer 3.

Besides the above methods for forming a projections pattern by applying reactive ion etching and ion milling method, ion implantation into the magnetic recording layer 2 may be carried out in order to form magnetically isolated dots. When a redeposition (re-sticking of materials abraded by etching or milling) component is stuck to the side wall of the peelable layer 3, the side wall part of the peelable layer is not exposed and is therefore deteriorated in peelability, ensuring that the redeposition components can be decreased.

Peeling Step

Figure 1F:
FIG. 1F is a view showing an example of a method for producing a magnetic recording medium according to a first embodiment.

As shown in FIGS. 1F and 2F, the mask pattern on the magnetic recording layer 2 is removed together with the peelable layer 3 to obtain the magnetic recording layer having a projections pattern. An alkali solution is used as the peeling solution to limit the deterioration in magnetic characteristics in a Co type perpendicular magnetic recording layer and to secure the peelability of the peelable layer 3. The pH of the solution can be changed by properly preparing the solution to reconcile the reduction in damages to magnetic recording layer and the peelability of the peelable layer. Particularly, the above requirements can be satisfied when the pH is 10 or less. In this case, the pH is desirably adjusted by diluting the alkali solution or by adding a buffer solution.

Further, as the alkali peeling solution, an organic alkali solution containing, for example, trimethylethylammonium hydroxide, tetramethylammonium hydroxide, tetraethylammonium hydroxide, methyltrihydroxyethylammonium hydroxide, or tetraalkylammonium hydroxide may be used.

Further, an inorganic alkali solution containing, for example, sodium hydroxide, potassium hydroxide, ammonium hydroxide, calcium hydroxide, barium hydroxide, magnesium hydroxide, or hydrazine may also be applied.

When the magnetic recording layer is exposed to an alkali peeling solution, a Co group hydrate is eluted from the magnetic recording layer and adheres to the surface of the magnetic recording layer, so that the flatness of the medium is eventually hindered. Typical examples of the Co eluted material include $CoCl_2$, $Co(OH)_2$, $Co(NH_2)_2$, $Co(OH)_3$, $Co(NH_2)_3$, $Co(NO_3)_2 \cdot 6H_2O$, and $Co(CH_3COO)_2$. An inorganic alkali solution may be used which is reduced in these eluted materials from the magnetic recording layer and in the precipitation. of Co organic materials.

As the peeling method, various methods besides the method in which a sample is dipped in an alkali solution may be applied. Further, liquid temperature may be adjusted to change the reactivity of the peelable layer with the alkali solution.

The peeling may be carried out in an atmosphere of inert gas such as Ar to avoid the reformation of the surface of the peelable layer. Moreover, a surfactant may be added to the alkali solution to improve the penetration of the solution into between fine patterns.

Protective Layer Formation Step

Figure 1G:
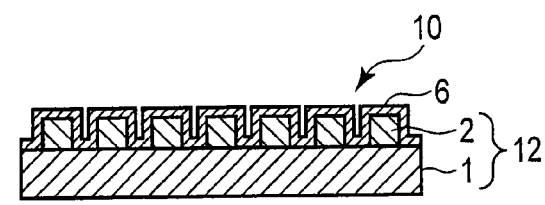
FIG. 1G is a view showing an example of a method for producing a magnetic recording medium according to a first embodiment.
Figure 3A:
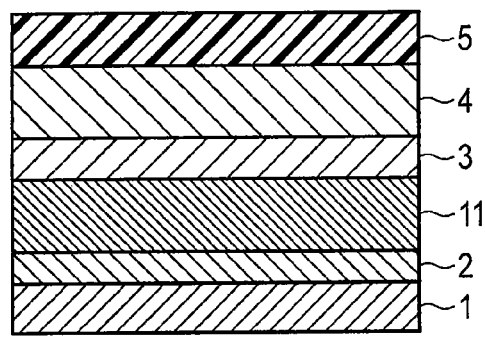
FIG. 3A is a view showing an example of a method for producing a magnetic recording medium according to a second embodiment.
Figure 3B:
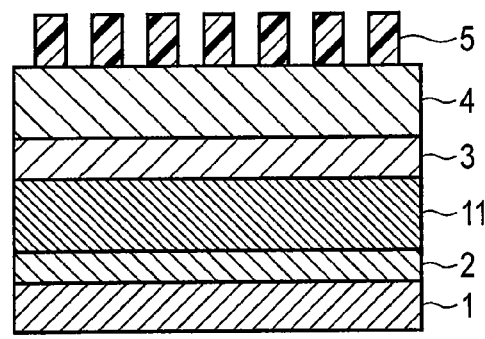
FIG. 3B is a view showing an example of a method for producing a magnetic recording medium according to a second embodiment.
Figure 3C:
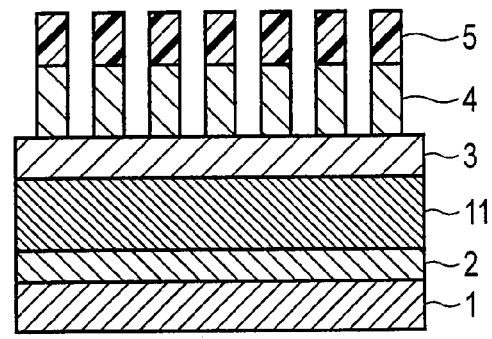
FIG. 3C is a view showing an example of a method for producing a magnetic recording medium according to a second embodiment.

Finally, as shown in FIGS. 1G and 2G, a C-type protective layer 6 and a fluorine-type lubrication film (not shown) are formed on the magnetic recording layer pattern 2 with projections to thereby obtain magnetic recording mediums 10 and 20 provided with a projections pattern.

(Second Embodiment)

An example showing a method for producing a magnetic recording medium according to a second embodiment is shown FIGS. 3A to 3I.

When, as shown in FIGS. 3A to 3I, the method for producing a magnetic recording medium according to a second embodiment is used, a magnetic recording medium 30 formed with a projections pattern can be formed in the same manner as in Example 1 except that the method further involves a step of forming an intermediate mask layer 11 between a magnetic recording layer 2 and a metal peelable layer 3, a step of transferring the projections pattern to the intermediate mask layer 11 between the step of transferring the projections pattern to the metal peelable layer 3 and the step of transferring the projections pattern to the magnetic recording layer 2, and a step of removing the intermediate mask layer 11 by etching after the step of removing the metal peelable layer 3.

As the material of the intermediate mask layer, for example, Ni, Ta, Cu, Cr, Si, C, Mo, Al, Zn, Au, Ag, W and alloys of these metals may be used. Further, a composite material obtained by combining a polymer with a metal may be used.

As a method of transferring the projections pattern to the intermediate mask layer, dry etching represented by the aforementioned reactive ion etching and Ar ion milling, wet etching using a solution and the like may be applied. Further, reactive etching, Ar ion milling, ashing, and wet etching may be likewise applied for the etching of the intermediate mask layer, that is, the removal of the intermediate mask layer from above the magnetic recording layer, and in this case, the deterioration of the magnetic recording layer can be reduced.

EXAMPLES

Example 1

In Example 1, example in which a patterning method using a resist film is applied in the step of forming a projections pattern will be explained.

Such an embodiment will be explained as follows. First, a magnetic recording layer was formed on a substrate by the DC sputtering method. The gas pressure was set to 0.7 Pa and the input power was set to 500 W to form a 10-nm-thick NiTa underlayer/4-nm-thick Pd underlayer/20-nm-thick Ru underlayer/10-nm-thick CoPt recording layer in this order from the substrate side, and finally a 3.5-nm-thick Pd protective layer was formed to obtain a magnetic recording layer.

In succession, an Al metal peelable layer was formed on the magnetic recording layer by the sputtering method. In this case, the gas pressure was set to 0.6 Pa and the input power was set to 500 W. Because the flatness of this Al layer largely affects the formation of the uppermost patterning mask layer, the surface roughness of the surface of the Al layer is preferably smaller. When the peelable layer is formed by only Al, increase in surface roughness caused by crystallization leads to deterioration in the projections pattern of the patterning layer and therefore, Al may be amorphous. Further, after patterning to a depth of several nm, the surface of the Al peelable layer exposed to the air is naturally oxidized, leading to deterioration in peelability. However, this deterioration can be limited by addition of metals. This example shows the case of producing a magnetic recording medium by applying Al to the peelable layer.

In the formation of the patterning mask layer on the metal peelable layer, 30-nm-thick C/3-nm-thick Si were formed in this order from the substrate side. In the formation of the film, a counter target type DC sputtering apparatus was used in the following condition: Ar gas flow rate: 35 sccm, Ar gas pressure: 0.3 Pa, and input power: 200 W.

Then, a patterning resist film was formed. In this example, a general electron beam positive resist was used. As the electron beam resist, ZEP-520A manufactured by Zeon Corporation was used and diluted with anisole used as a solvent in a ratio by weight of 1:3 to prepare a solution, which was then applied to the substrate by spin coating at 2500 rpm. The sample was kept at 180° C. by using a vacuum hot plate to prebake for 180 sec, thereby curing the electron beam resist.

The peelable layer, the mask layer and the resist layer were formed on the magnetic recording medium in this manner.

Then, a pattern was drawn in the electron beam resist by using an electron beam lithography system provided with a 100-kV acceleration voltage and 10-nm-diameter beam having a ZrO/O thermal field emission type electron source. The electron beam lithography system is a so-called x-θ type lithographic system provided with signals used to form a writing pattern and with a one-way moving mechanism and rotating mechanism of a sample stage. In the writing in the sample, the signals used to polarize electron beams are synchronized and the stage is moved in a radial direction. Here, a latent image of a dot/space pattern at a pitch of 30 nm was formed on the electron beam resist in the following condition: write linear velocity: 0.15 m/s, beam current: 13 nA, and feed rate in a radial direction: 10 nm.

Figure 8:
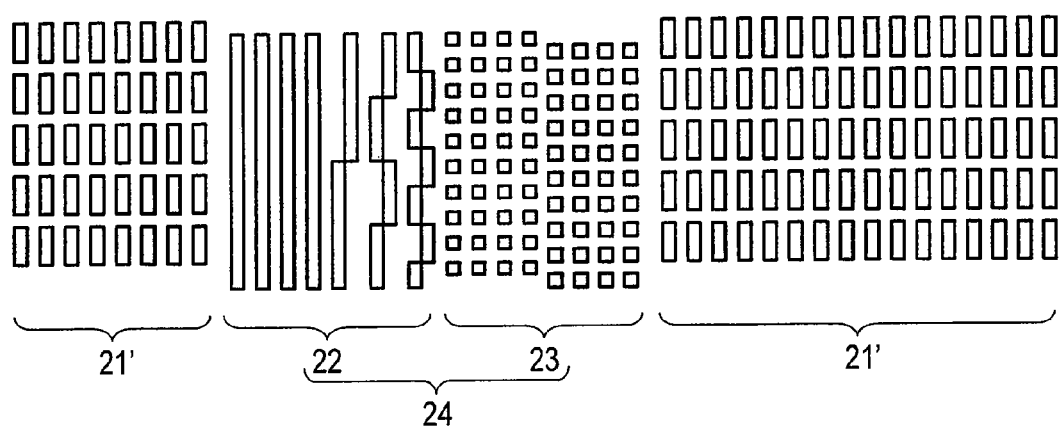
FIG. 8 is a view showing an example of a recording bit-pattern in the direction of the periphery of a magnetic recording medium.

FIG. 8 is a view showing an example of a recording bit pattern in the peripheral direction of the magnetic recording medium.

The pattern of the magnetic recording layer is, as shown in FIG. 8, largely divided into a recording bit region 21' that stores data corresponding to digital signals "0" and "1" and a so-called servo region 24 including a preamble address pattern 22 and a burst pattern 23 which are magnetic head alignment signals and these regions are formed as longitudinal pattern.

In succession, the resist pattern was developed to form a projections pattern. In the development, an organic developing solution using a component constituted of 100% normal amyl acetate was used and the sample was dipped in the organic developing solution for 20 sec to develop the electron beam resist. Then, the sample was dipped in isopropyl alcohol for 20 sec to carry out rinsing and then the surface of the sample was dried by direct blow of $N_2$.

The Si layer was etched using the electron beam resist pattern as a mask. In the etching, an induction coupling type reactive ion etching apparatus was used. Using $CF_4$ as etching gas, the Si layer was etched in the following condition: ultimate vacuum: $1.0 \times 10^{-5}$, gas flow rate: 5 sccm, antenna power: 100 W, bias power: 5 W, etching gas pressure: 0.1 Pa, and etching time: 17 sec. Further, similarly, the under layer C was etched using $O_2$ as etching gas in the following condition: antenna power: 100 W, bias power 20 W, etching gas pressure: 0.1 Pa, and etching time: 30 sec.

The Al peelable layer lying just under the C layer was patterned by Ar ion milling. The Ar ion milling was carried out in the following condition: Ar ion acceleration voltage: 300 V, gas flow rate: 3 sccm, milling pressure: 0.1 Pa, and milling time: 12 sec, to perform patterning of the Al film in a thickness of 5 nm.

Similarly, the transfer of the projections pattern to the magnetic recording layer was performed by Ar ion milling in the condition of an acceleration voltage of 300 V and a milling time of 120 sec.

In order to remove the mask above the magnetic recording layer formed with the projections pattern, the magnetic recording medium with the peelable layer, mask layer and resist layer formed thereon was dipped in an aqueous 0.05% sodium hydroxide solution used as a solvent, for 300 sec to dissolve the Al metal peelable layer in an alkali solvent, thereby lifting off the mask layer and resist layer together with the peelable layer.

Here, the magnetostatic characteristics of the CoPt film after dipping in the aqueous sodium hydroxide solution was evaluated to examine the influence on the magnetic recording layer when the magnetic recording layer is exposed to the aqueous sodium hydroxide solution. Moreover, using an aqueous 0.1% sodium hydroxide solution, the same dipping test was carried out for 300 sec to evaluate the magnetostatic characteristics. As a result, a graph showing the relation between the concentration of an alkali solution and magnetization is shown in FIG. 4. Further, a graph showing the relation between the concentration of an alkali solution and coercive force is shown in FIG. 5.

As illustrated, reduction in saturated magnetization and increase in coercive force were relatively small, and it was therefore found that the mask could be peeled while restraining deterioration in the characteristics of the magnetic recording layer.

Figure 6:
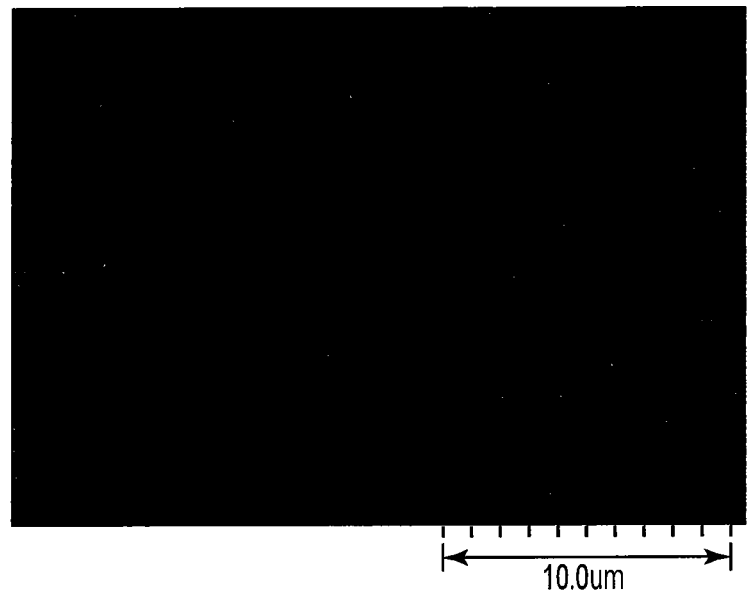
FIG. 6 is a SEM image photograph showing the condition of the surface of a CoPt continuous film after being dipped in an aqueous sodium hydroxide solution.
Figure 7:
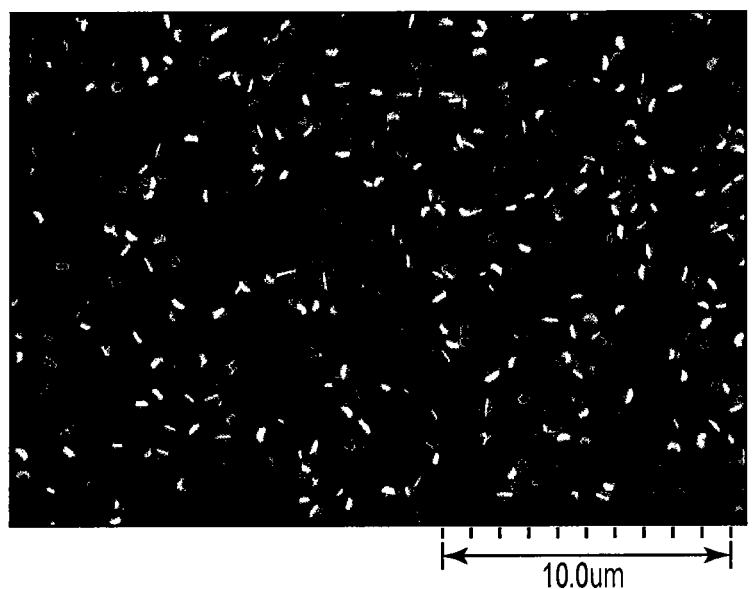
FIG. 7 is a SEM image photograph showing the condition of the surface of a CoPt continuous film after being dipped in an aqueous sodium hydroxide solution.

Then, the surface of the CoPt continuous film after being dipped in the sodium hydroxide solution was observed by a scanning electron microscope (SEM). A SEM image of the surface of the CoPt continuous film when an aqueous 0.05% sodium hydroxide solution is used is shown in FIG. 6 and a SEM image of the surface of the CoPt continuous film when an aqueous 0.1% sodium hydroxide solution is used is shown in FIG. 7. It was found that the amount of a Co type eluted material to be stuck was reduced after being dipped in a solution having a concentration 0.05% or less.

The peeling rate of an Al compound in a sodium hydroxide solution can be made to be several times larger than that of Al by adding a metal, and therefore, the addition of metals is useful also from the viewpoint of reducing process time.

After that, a diamond-like carbon protective layer 5 nm in thickness was formed on the magnetic recording layer with the projections pattern formed thereon by the DC sputtering method.

Finally, a perfluoropolyether type lubrication film 1.5 nm in thickness was formed on the diamond-like carbon protective layer by dip coating to obtain a magnetic recording medium.

Because, like this embodiment, the flatness is improved when the peelable layer is formed of Al to which a metal is added, a variation in pattern can be reduced. Further, macroscopic pattern unevenness is limited and therefore, a magnetic recording medium having good longitudinal uniformity can be produced. Moreover, peelability is improved with increase in etching rate ensuring that a magnetic recording medium improved in gliding characteristics and signal S/N is obtained.

Example 2

In Example 2, an example will be explained in which a self-organizing film constituted of a diblock copolymer is applied to the resist layer in the projections pattern forming step.

The magnetic recording layer formation step, peelable layer formation step, and mask layer formation step are not substantially different from those of the first embodiment and therefore, detailed explanations of these steps are omitted here.

A self-organizing film was formed on the mask layer. First, a block copolymer solution was applied onto a substrate. As the block copolymer solution, a solution prepared by dissolving a block copolymer constituted of a polystyrene and a polydimethylsiloxane in a coating solvent was used. The molecular weights of the polystyrene and polydimethylsiloxane were 1700 and 2900 respectively. Further, annisol was used as a solvent to prepare a polymer solution having a percentage concentration by weight of 1.5% was prepared.

This solution was applied onto a mask at 5000 rpm by a spinner to form a self-organizing film. Then, heat annealing was carried out to separate a dot pattern constituted of polydimethylsiloxane from a matrix constituted of polystyrene by microphase separation inside of the self-organizing film.

In the heat annealing, a vacuum heater was used to carry out annealing at 170° C. in the heater having an atmosphere of a reduced pressure of 0.2 Pa for 12 hr to form a microphase separation structure inside of the self-organizing film. In this case, this annealing may be so-called solvent annealing in which a sample is exposed to an organic solvent atmosphere.

In succession, a projections pattern was formed based on the phase separation pattern by etching. The etching was carried out by induction coupling plasma type reactive ion etching. In this case, the process gas pressure was 0.1 Pa and the gas flow rate was 5 sccm. First, in order to remove polydimethylsiloxane of the surface layer of the self-organizing film, etching was carried out using $CF_4$ gas as an etchant in the condition of an antenna power of 50 W and a bias power of 5 W for 7 sec. Then, etching was carried out using $O_2$ gas as an etchant in the condition of an antenna power of 50 W and a bias power of 5 W for 200 sec to remove polystyrene of the matrix. Because the $O_2$ etchant used to remove polystyrene also etches the underlayer C mask, Si was used as a stopper layer to terminate the etching. A projections pattern made of the diblock copolymer was thus formed.

Moreover, the projections pattern was transferred to the lower mask layer. The mask layer was processed by induction coupling plasma type reactive ion etching in the same manner as in the case of the formation of the projections pattern in the self-organizing film. The etching was carried out in the condition of process pressure of 0.1 Pa and a gas flow rate of 5 sccm. In the removal of the Si layer, etching was carried out using a $CF_4$ etchant in the condition of an antenna power of 50 W and a bias power of 5 W for 20 sec. Further, in the removal of the C layer, etching was carried out using an $O_2$ etchant in the condition of an antenna power of 100 W and a bias power of 10 W for 20 sec.

The pattern was transferred to the peelable layer and to the magnetic recording layer in the same manner as in Example 1 to form the projections pattern on the magnetic recording layer and then the Al compound peelable layer was removed by dipping in a sodium hydroxide solution. Finally, the C-type protective layer and F-type protective layer were formed to obtain a magnetic recording medium which was improved in longitudinal uniformity and reduced in peeling residue.

Example 3

In Example 3, an example will be explained in which a projections pattern is formed by nano-imprinting onto the resist layer. The transfer of the projections pattern and the peeling process are the same as those in Examples 1 and 2.

An ultraviolet-curable resist layer was applied to the surface of the Si mask in a thickness of 40 nm by spin coating. As the ultraviolet-curable resist material, ZEONOR106OR (manufactured by Zeon Corporation) was used. A resin stamper with a 30-nm-pitched pattern formed thereon was imprinted and held on this resist layer, and then irradiated with ultraviolet rays to cure the resist pattern. Then, the resin stamper was released to obtain the projections pattern of the resist layer was obtained.

Because a residue was left in the imprinted recessed portion, this residue was removed by reactive ion etching to expose the Si mask layer. In the reactive ion etching, $O_2$ gas was used to carry out etching in the condition of an antenna power of 100 W and a bias power of 20 W for 7 sec, thereby removing the residue.

In succession, the pattern was transferred to the peelable layer and to the magnetic recording layer in the same manner as in Example 1 to form the projections pattern on the magnetic recording layer and then the Al compound peelable layer was removed by dipping in a NaOH solution. Finally, the C-type protective layer and F-type protective layer were formed to obtain a magnetic recording medium which was improved in longitudinal uniformity and reduced in peeling residue.

Example 4

In Example 4, an example will be explained in which one intermediate mask layer is further formed between the magnetic recording layer and the Al metal peelable layer.

NiTa was selected as the first mask layer on the magnetic recording layer to form the first mask layer in a thickness of 5 nm by the DC sputtering method. The formations of the peelable layer, the mask layer on the peelable layer and the resist patterning layer are the same as those in Examples 1 and 2. After a projections pattern was formed on the peelable layer by $O_2$ etching, the projections pattern was transferred to the NiTa mask layer and to the magnetic recording layer by Ar ion milling at an acceleration voltage of 300 V. Because the milling resistance of the NiTa film is lower than that of the magnetic recording layer, the NiTa mask layer can be physically removed with restraining deterioration in the form of the recording layer. Then, lift-off treatment using a sodium hydroxide solution was performed to remove the pattern on the NiTa mask. Further, the NiTa mask was physically peeled by Ar ion milling to thereby obtain a magnetic recording layer with a projections pattern formed thereon. Finally, a perfluoropolyether type lubricating film was formed in a thickness of 1.5 nm to obtain a magnetic recording medium producing the same effect as that of Example 1.

Usually, when plurality of mask layers are formed, the time required for wet etching is increased with increasing of the pattern aspect ratio and therefore, the time during which the magnetic recording layer is exposed to the solution is increased. This leads to increased damages to the magnetic recording layer. However, since the number of mask layers is decreased in advance as shown in this example, the peeling of the mask is easily made, so that a magnetic recording medium which is reduced in peeling residue and improved in signal S/N is obtained.

Comparative Example 1

In Comparative Example 1, an example will be explained in which a metal other than the Al compound is applied to the peelable layer on the magnetic recording layer.

As the peelable layer material, Si, $SiO_2$, $MoSi_2$, Ni, NiTa, Ta, W, Mo, Cr, $Cr_2O_3$, C, Ti, or TiN was applied. A mask intermediate layer, a peelable layer, a mask layer, and a resist or a self-organizing layer were formed on the magnetic recording medium in the same manner as in Examples 1 to 3 except that an Al compound was applied which was obtained by adding Al-10% BN, Al-10% C, Al-10% Si, or Al-10% $B_4C$ which was obtained by adding a semimetal or nonmetal to Al was added. When a sodium hydroxide solution was used to remove the peelable layer after the pattern was transferred to the magnetic recording layer, each metal containing no Al became insoluble in a peeling solution and therefore, the peeling of the mask could not be accomplished.

In the case of the Al compounds to which elements were added, a magnetic recording medium could be obtained which was improved in peelability, had high peeling rate and was reduced in peeling residue.

The method for producing a magnetic recording medium in this embodiment involves the step of removing the peelable layer by dissolution in an alkali solution to peel the mask pattern from the magnetic recording layer after the peelable layer made of Al or an Al compound is formed on the magnetic recording layer to form the projections pattern on the magnetic recording layer.

Because the Al peelable layer can be dissolved by using a weak alkali solution having a relatively low pH, damages to the magnetic recording layer are reduced. Therefore, a recording medium can be manufactured without any deterioration in magnetic characteristics in the magnetic recording layer.

Further, because the improvement in peelability enables reduction in mask pattern residue, flatness on the medium is improved. Accordingly, a magnetic recording medium improved in HDI characteristics is obtained.

Because the Al peelable layer forms a natural oxide film on the surface layer exposed to the air, it is resultantly more deteriorated in peelability than a pure Al layer. In light of this, elements are added to the Al layer to thereby apply an Al peelable layer limited in oxidation. In this case, the Al peelable layer can be removed more rapidly than a pure Al peelable layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for producing a magnetic recording medium, comprising:
    forming a magnetic recording layer on a substrate;
    forming a metal peelable layer comprising an aluminum compound on the magnetic recording layer, the aluminum compound containing at least boron and one of nitrogen and carbon;
    forming a mask layer on the metal peelable layer;
    forming a projections pattern on the mask layer;
    transferring the projections pattern to the metal peelable layer;
    transferring the projections pattern to the magnetic recording layer; and
    dissolving, and thereby removing, the metal peelable layer comprising the aluminum compound containing at least boron and one of nitrogen and carbon, by using an alkali solution.

2. The method for producing a magnetic recording medium according to claim 1,
    wherein the mask layer comprises a multilayer body containing a first layer and a second layer made of a material different from that of the first layer.

3. The method for producing a magnetic recording medium according to claim 1, further comprising:
    forming an intermediate mask layer between the magnetic recording layer and the metal peelable layer;
    transferring the projections pattern to the intermediate mask layer between transferring the projections pattern to the metal peelable layer and transferring the projections pattern to the magnetic recording layer; and
    removing the intermediate mask layer by etching after removing the metal peelable layer.

4. The method for producing a magnetic recording medium according to claim 1,
    wherein the projections pattern of the mask layer is transferred using a self-organizing film comprising a block copolymer or a random copolymer containing at least two polymer chains.

5. The method for producing a magnetic recording medium according to claim 1,
    wherein the alkali solution is an organic alkali.

6. The method for producing a magnetic recording medium according to claim 1,
    wherein the alkali solution is an inorganic alkali.

* * * * *